United States Patent
Ishio et al.

(10) Patent No.: US 6,761,306 B2
(45) Date of Patent: Jul. 13, 2004

(54) PHOSPHORUS-COPPER BRAZING MATERIAL, BRAZING SHEET, METHODS OF MANUFACTURING THE MATERIAL AND THE SHEET, AND FLOW PATH STRUCTURE FOR HEAT EXCHANGERS

(75) Inventors: Masaaki Ishio, Osaka (JP); Tsuyoshi Hasegawa, Ibaraki (JP); Ken Yamamoto, Oobu (JP); Norihide Kawachi, Kariya (JP); Kenichiro Kamon, Osaka (JP)

(73) Assignee: Sumitomo Special Metals Co, Ltd., Osaka (JP)

( * ) Notice: Subject to any disclaimer, the term of this patent is extended or adjusted under 35 U.S.C. 154(b) by 12 days.

(21) Appl. No.: 10/287,713

(22) Filed: Nov. 5, 2002

(65) Prior Publication Data

US 2003/0085258 A1 May 8, 2003

(30) Foreign Application Priority Data

Nov. 6, 2001 (JP) ........................................ 2001-340152

(51) Int. Cl.⁷ ..................... B23K 1/19; B23K 20/16; B23K 35/24; C22C 9/02
(52) U.S. Cl. ............... 228/262.61; 228/183; 228/262.6; 420/469; 420/472
(58) Field of Search ........................ 228/115, 117, 228/183, 190, 252, 254, 262.6, 262.61; 148/432; 420/472, 469

(56) References Cited

U.S. PATENT DOCUMENTS

| 1,954,168 | A | | 4/1934 | Ellis et al. | |
|---|---|---|---|---|---|
| 3,693,243 | A | * | 9/1972 | Steigelman | 228/200 |
| 4,988,035 | A | * | 1/1991 | Ueno et al. | 228/175 |
| 5,330,097 | A | * | 7/1994 | Inoue | 228/194 |
| 5,429,794 | A | * | 7/1995 | Kamf et al. | 420/477 |
| 5,874,178 | A | * | 2/1999 | Takayasu | 428/681 |
| 6,202,703 | B1 | * | 3/2001 | Kuroda et al. | 138/178 |
| 6,613,123 | B2 | * | 9/2003 | Corbin et al. | 75/255 |
| 2002/0170633 | A1 | * | 11/2002 | Uchida et al. | 148/430 |
| 2003/0024969 | A1 | * | 2/2003 | Harris | 228/262.61 |
| 2003/0026724 | A1 | * | 2/2003 | Harris | 420/472 |

FOREIGN PATENT DOCUMENTS

| DE | 19629376 A1 | * | 1/1998 |
|---|---|---|---|
| JP | 51-9704 | | 3/1976 |
| JP | 56-139642 | | 10/1981 |
| JP | 58-128292 | | 7/1983 |
| JP | 58-163569 | | 9/1983 |
| JP | 1-154896 | | 6/1989 |

* cited by examiner

Primary Examiner—L. Edmondson
(74) Attorney, Agent, or Firm—Keating & Bennett, LLP

(57) ABSTRACT

A phosphorus-copper brazing material formed of a phosphorus-copper brazing alloy which can easily be cold-worked into a thin sheet, a brazing sheet having a brazing layer of the phosphorus-copper brazing alloy, and a flow path structure for heat exchangers constructed by brazing with the alloy, are such that the phosphorus-copper brazing material includes a phosphorus-copper brazing alloy containing Cu as a major component and phosphorus of not less than about 2.0 mass % to not more than about 3.2 mass %. The brazing sheet includes a metal sheet, and a brazing material layer that is integral with the metal sheet on at least one side of the metal sheet, the brazing material layer being formed of the phosphorus-copper brazing alloy. The metal sheet may be formed of copper or a copper alloy containing Cu as a major component.

8 Claims, 3 Drawing Sheets

PHOSPHORUS-COPPER BRAZING MATERIAL, BRAZING SHEET, METHODS OF MANUFACTURING THE MATERIAL AND THE SHEET, AND FLOW PATH STRUCTURE FOR HEAT EXCHANGERS

BACKGROUND OF THE INVENTION

1. Field of the Invention

The present invention relates to a phosphorus-copper brazing material and a brazing sheet having a brazing material layer formed of a phosphorus-copper brazing alloy for use in the brazing of parts or members to each other in heat exchangers, electric device components, piping and other such apparatuses. The present invention also relates to a flow path structure for heat exchangers wherein flow path forming members are brazed to each other with such a phosphorus-copper brazing alloy.

2. Description of the Related Art

Members forming flow paths in heat exchangers are formed of Cu (copper) or a Cu alloy including Cu as a major component. Conventionally, such members are brazed to each other with a phosphorus-copper brazing material. According to JIS (Japanese Industry Standards) Z 3264, such a phosphorus-copper brazing material contains 4.8 mass % to 7.5 mass % of P and optionally Ag, the balance consisting of Cu. Since phosphorus-copper brazing materials generally have very poor workability, they are usually supplied in the form of wire, rod or powder. In brazing members of heat exchangers, Ag-free phosphorus-copper brazing materials are generally used because Ag is expensive and might cause a metal allergy in human bodies.

In a brazing operation using a phosphorus-copper brazing material, it is difficult to use the brazing material in the form of rod or power and, hence, the brazing material is preferably in the form of a thin sheet. For this reason Japanese Patent Laid-Open Gazette No. 58-128292, for example, has proposed a phosphorus-copper brazing material exhibiting high cold workability, which is prepared through a process including the steps of: obtaining a crystalline thin strip directly from a molten phosphorus-copper brazing alloy containing P in an amount of 4 wt % to 10 wt % by rapidly cooling and solidifying the molten alloy, and then heat-treating the strip.

However, the preparation of such a phosphorus-copper brazing material requires direct and rapid cooling and solidification of the molten phosphorus-copper brazing alloy, which requires the use of large-scale special production equipment. Further, a special heat treatment is needed to improve the ductility and flexibility of the crystalline thin strip. Therefore, the production cost and the productivity are not satisfactory.

SUMMARY OF THE INVENTION

In order to overcome the foregoing problems with conventional methods and devices, preferred embodiments of the present invention provide a brazing material including a phosphorus-copper brazing alloy which can easily be worked into a thin sheet through a cold working process without the need of any special production equipment and any special heat treatment, a brazing sheet having a brazing material layer including such a novel phosphorus-copper brazing alloy, and a flow path structure for heat exchangers including flow path forming members brazed to each other with such a novel phosphorus-copper brazing alloy.

The inventors of the present invention have conducted detailed research on the workability and brazing properties of phosphorus-copper alloys having different P (phosphorus) contents and, as a result, discovered that markedly improved workability can be obtained without sacrificing brazeability when the P content of an alloy falls within a specific range of from about 2.0 mass % to about 3.2 mass %. The present invention has been developed based on this discovery.

According to a preferred embodiment of the present invention, a phosphorus-copper brazing material includes copper as a major component and phosphorus of not less than about 2.0 mass % to not more than about 3.2 mass %, preferably not less than about 2.2 mass % to not more than about 2.9 mass %.

By merely adjusting the P content of a phosphorus-copper alloy so that the P content is within the range of not less than about 2.0 mass % to not more than about 3.2 mass % the alloy is imparted with very high cold workability without deterioration of brazeability.

When the phosphorus-copper brazing material is formed into a thin sheet having a thickness of about 0.01 mm to about 0.15 mm inclusive, the brazing material has excellent brazing operability and very high cost efficiency. Since the phosphorus-copper brazing alloy forming the phosphorus-copper brazing material has excellent cold workability, the thin sheet phosphorus-copper brazing material can simply and easily be manufactured by merely cold-rolling a hot-rolled sheet of the phosphorus-copper brazing alloy into a thin sheet.

According to another preferred embodiment of the present invention, a brazing sheet includes a metal sheet, and a brazing material layer formed integral with the metal sheet on least one side of the metal sheet, the brazing material layer being formed of a phosphorus-copper brazing alloy including copper as a major component and phosphorus of not less than about 2.0 mass % to not more than about 3.2 mass %. The content of phosphorus in the phosphorus-copper brazing alloy preferably ranges not less than about 2.2 mass % to not more than about 2.9 mass %.

In the brazing sheet of this preferred embodiment of the present invention, the brazing material layer formed integral with the metal sheet is formed of the phosphorus-copper brazing alloy having very high cold workability. Hence, when brazing the metal sheet to another metal member, the brazing sheet does not necessitate cumbersome operations including separately providing a brazing material and positioning the brazing material between the metal sheet and the metal member. For this reason, the brazing sheet according to preferred embodiments of the present invention has excellent brazing operability.

If the metal sheet of the brazing sheet is formed of copper or a copper alloy including copper as a major component, improvements are achieved in the pressure weldability between the metal sheet and the brazing material layer and in the productivity of the brazing sheet. Further, an improvement is achieved in the fusion-bonding property, or wettability between the two upon brazing and, hence, such a brazing sheet exhibits superior brazeability.

Since the brazing material layer of the brazing sheet is formed of the phosphorus-copper brazing alloy having superior cold workability, the brazing sheet can simply and easily be manufactured through a process including the steps of: superposing a brazing material sheet formed of a phosphorus-copper brazing alloy on at least one side of a metal substrate, the phosphorus-copper brazing alloy including copper as a major component and phosphorus of not less than about 2.0 mass % to not more than about 3.2 mass %, and cold pressure-welding the brazing material sheet to the metal substrate to form a one-piece sheet in which a brazing material layer reduced from the brazing material sheet is formed integral with a metal sheet reduced from the metal substrate.

According to yet another preferred embodiment of the present invention, a flow path structure for heat exchangers includes a pair of first and second wall members disposed opposite to each other, and a partition member partitioning a flow path disposed between the first and second wall members into a plurality of trickle regions, the partition member being brazed to opposed surfaces of the first and second wall members with a phosphorus-copper brazing alloy including copper as a major component and phosphorus of not less than about 2.0 mass % to not more than about 3.2 mass %.

Since the phosphorus-copper brazing alloy used to form the flow path structure mentioned above includes phosphorus of not less than about 2.0 mass % to not more than about 3.2 mass %, preferably not less than about 2.2 mass % to not more than about 2.9 mass % and hence has very high cold workability, it is possible to attach the phosphorus-copper brazing alloy previously formed into an appropriate shape to each of the opposite surfaces of the first and second wall members before the brazing of the partition member to the wall members. Thus, the operation of brazing the partition member to the wall members can be facilitated, which leads to an improvement in the productivity of heat exchangers.

In this flow path structure, if the first and second wall members and the partition member are formed of copper or a copper alloy including copper as a major component, these members can simply and easily be brazed together via the aforementioned phosphorus-copper brazing alloy and be brazed with superior joining. Further, since copper used as the major component of the members forming the flow path structure is relatively inexpensive, the flow path structure is cost-efficient as a flow path for heat exchangers.

These and other features, elements, steps, characteristics and attendant advantages of the present invention will become apparent from the following detailed description of preferred embodiments thereof when read in conjunction with the accompanying drawings.

DETAILED DESCRIPTION OF PREFERRED EMBODIMENTS

Figure 1:
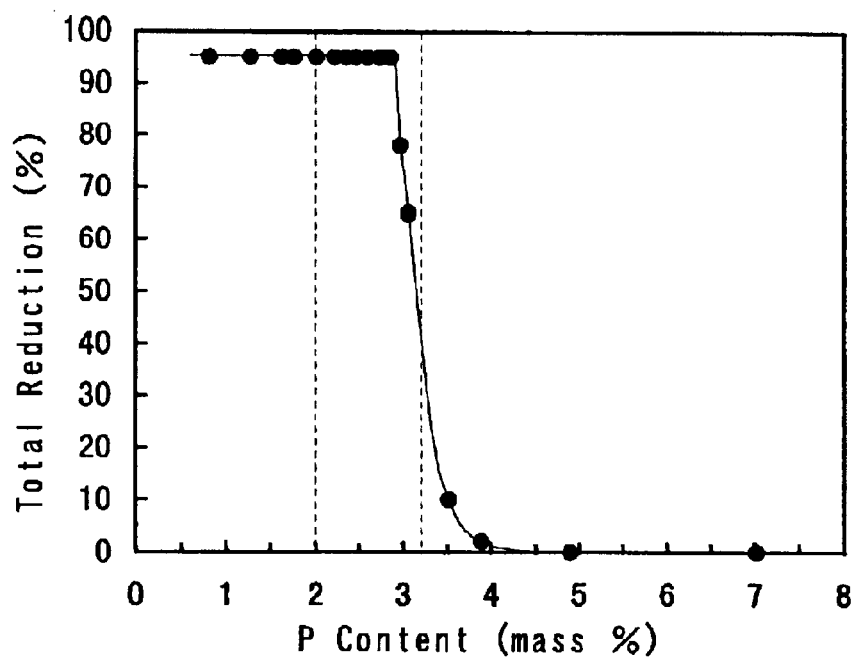
FIG. 1 is a graph showing the relationship between a P content and workability (a total reduction in an intended sheet thickness or in the occurrence of a crack)

The present invention will now be described in detail with respect to preferred embodiments thereof with reference to the drawings.

In brazing parts or members each formed of Cu or a Cu alloy including Cu as a major component to each other with a Cu alloy brazing material in the manufacture of heat exchangers or the like, it is preferred that the brazed portion have a joint strength that is substantially equal to the tensile strength of Cu, the brazing be easily achieved even if the members to be brazed to each other have complicated shapes, and the brazing material be harmless to human bodies. P (phosphorus) is advantageous as an element to be added to a Cu alloy having such characteristics because a P—Cu alloy has excellent brazeability with respect to members having a complicated shape since P—Cu alloy contains $Cu_3P$ having a reducing effect on a copper oxide and hence is self-fluxing, and because P is harmless to human bodies.

Previously, it has been considered that the P content (mass %) of such a phosphorus-copper brazing alloy should be at least about 4% in order to realize a joint strength that is substantially equal to the tensile strength of Cu. For this reason, a problem of workability is inevitable in such conventional phosphorus-copper brazing alloys. Research by the inventors of the present invention has led to the discovery that a certain low P concentration region, which is lower than the conventionally-used P concentration region, imparts a phosphorus-copper brazing alloy with markedly improved workability without deteriorating the brazeability (joint strength) of the alloy. The present invention has been developed based on this discovery. Detailed description will be made of the relationship between the P content of a phosphorus-copper brazing alloy and the brazeability and workability of the phosphorus-copper alloy.

P—Cu alloys having different P contents shown in Table 1 below were melted by vacuum induction melting, and cast pieces of respective P—Cu alloys were hot-rolled at a temperature of about 500° C. to 600° C. The resulting hot-rolled plates (thickness=8 mm, width=80 mm, for example) were further subjected to cold rolling. The cold rolling was performed aiming at an intended sheet thickness of for example, about 0.4 mm (total rolling reduction =95%). For the samples which allowed edge cracking or sheet cracking thereof to occur before the intended sheet thickness was reached, the total rolling reduction made until such cracking occurred was determined. The samples which allowed edge cracking to occur at a rolling reduction of about 65% or more were annealed at about 500° C. for about one hour and then cold-rolled to the intended sheet thickness. The term "edge cracking", as used herein, means the occurrence of serrations about 1 mm to 2 mm high at a side edge of a rolled material, while the term "sheet cracking", as used herein, means complete widthwise breaking of a rolled sheet. The occurrence of sheet cracking makes subsequent rolling impossible.

The samples cold-rolled to the intended sheet thickness were annealed at about 500° C. for about one hour and then further cold-rolled to a thickness of about 0.1 mm to produce thin-sheet brazing materials. On the other hand, the sample alloys which allowed sheet cracking to occur during cold rolling and the sample alloys which allowed edge cracking to occur at a rolling reduction of about 10% or less, were formed into respective thin sheets, which in turn were formed into respective thin-sheet brazing materials each having a sheet thickness of about 0.1 mm (equivalent to a thickness attained by rolling to a total rolling reduction of about 97%) by machining hot-rolled plates. These brazing materials were tested for their brazeability.

Rectangular rods of pure Cu each having a section of approximately 10 mm×3 mm, for example, were provided, and one rod and another rod were placed in abutting relation to each other through a brazing material piece (having approximate dimensions of 10 mm×3 mm) and then held at about 820° C. for approximately 10 minutes in a hydrogen gas atmosphere to achieve brazing. The joined rod thus obtained was pulled longitudinally until break to measure the tensile strength at break (joint strength) of the joint. The brazeability of each brazing material was evaluated by the tensile strength at break of the joint made by the brazing material.

Table 1 shows workability evaluations of the P—Cu alloys together with measured joint strengths of the brazed rods. "Total Rolling Reduction" in Table 1 represents a total rolling reduction made until the intended thickness (about 95%) was reached or until edge cracking or sheet cracking occurred. The relationship between a P content and a workability evaluation (total rolling reduction) is shown in FIG. 1, while the relationship between a P content and a joint strength shown in FIG. 2.

TABLE 1

| Sample No. | P Content mass % | Workability Evaluation | Total Rolling Reduction % | Joint Strength kgf/mm$^2$ |
|---|---|---|---|---|
| 1 | 0.81 | No crack | 95 | 0 |
| 2 | 1.28 | No crack | 95 | 4.19 |
| 3 | 1.63 | No crack | 95 | 7.87 |
| 4 | 1.76 | No crack | 95 | 8.51 |
| 5 | 2.01 | No crack | 95 | 17.5 |
| 6 | 2.22 | No crack | 95 | 18.56 |
| 7 | 2.35 | No crack | 95 | 17.31 |
| 8 | 2.47 | No crack | 95 | 19.16 |
| 9 | 2.6 | No crack | 95 | 20.68 |
| 10 | 2.74 | No crack | 95 | 19.54 |
| 11 | 2.86 | No crack | 95 | 20.01 |
| 12 | 2.97 | Edge cracking occurred | 78 | 18.14 |
| 13 | 3.06 | Edge cracking occurred | 65 | 17.6 |
| 14 | 3.52 | Edge cracking occurred | 10 | 18.2 |
| 15 | 3.89 | Sheet cracking occurred | 2 | 19.1 |
| 16 | 4.9 | Sheet cracking occurred | 0 | 18.8 |
| 17 | 7.02 | Sheet cracking occurred | 0 | 18.59 |

As seen from Table 1 and FIG. 1, when the P content was not more than about 3.2%, the cold workability was favorable; particularly when the P content was not more than about 2.90%, which is considered to be a critical point, the cold workability was improved by significant amounts with absolutely no sheet cracking nor edge cracking.

Figure 3:
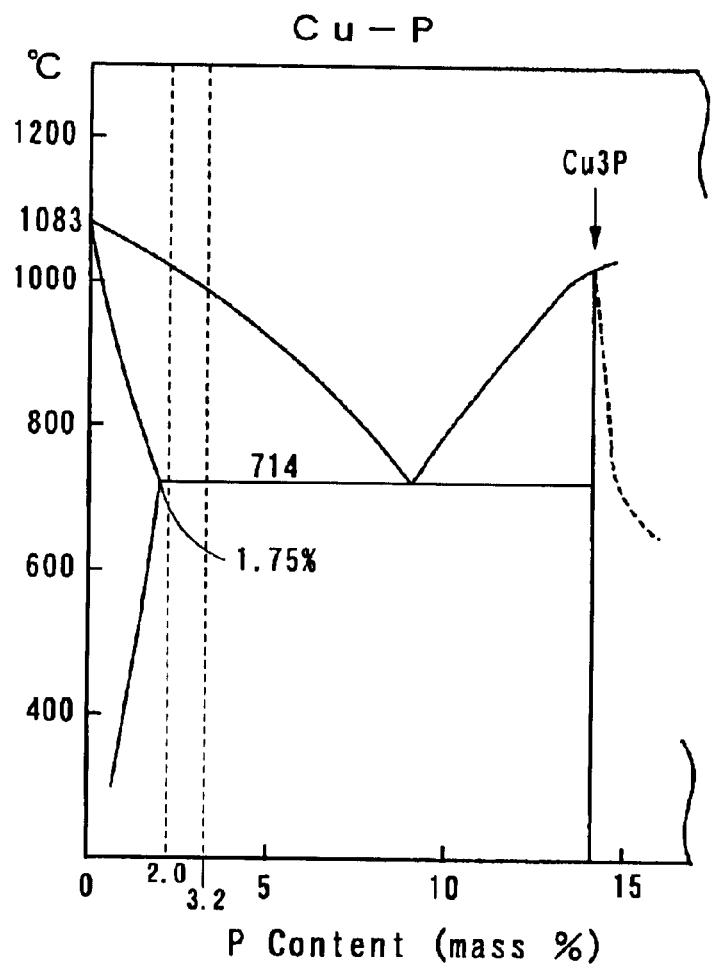
FIG. 3 is a partial phase diagram of a phosphorus-copper alloy.

The inventors of the present invention studied the workability of phosphorus-copper brazing alloys from the viewpoint of texture. As shown in the partial phase diagram of P—Cu binary system at FIG. 3, when the P content is in the approximate range of 1.75%<P<13.98% (eutectic composition), the resulting texture includes a P—Cu solid solution (Cu-rich portion) in a primary crystallization state produced in the texture and an eutectic structure in which Cu$_3$P and Cu are layered one on the other (P-rich portion). That is, the Cu-rich portion and the P-rich portion coexist in this texture. According to observation of the textures of actual hot-rolled brazing material sheets under a microscope, when the P content was not more than about 3.2%, most of P-rich portions were isolated from each other within a Cu-rich portion, whereas when the P content was more than about 3.2%, P-rich portions within a Cu-rich portion became continuous with each other and this tendency became more striking with increasing P content. According to observation of the textures of cold-rolled sheets having undergone sheet cracking, sheets containing P more than about 3.2% were each observed to have a multiplicity of cracks along a P-rich portion stretched due to rolling. From these observations it has been found that P=3.2% is a limit P content which allows P-rich portions, which are brittle and easy to crack, to be substantially isolated from each other within a Cu-rich portion.

Figure 2:
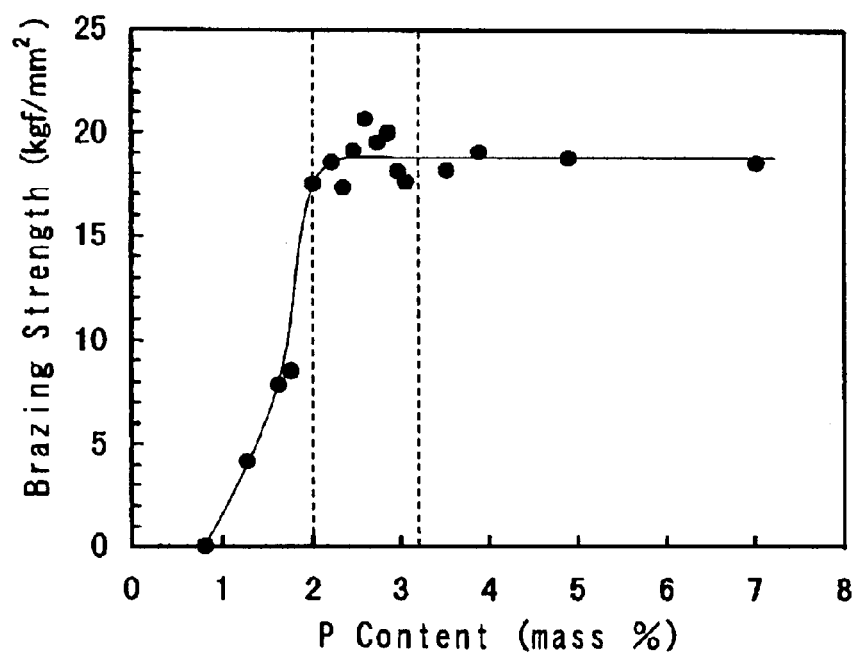
FIG. 2 is a graph showing the relationship between a P content and a brazing strength.

As also seen from Table 1 and FIG. 2, each of the alloys containing P of not less than about 2.0% had a tensile strength of about 18 kgf/mm$^2$, which is substantially equal to that of pure Cu; particularly when the P content was not less than about 2.2%, a superior joint strength was obtained. Even when the P content was less than about 2.0% and not less than about 1.2%, a joint strength up to a certain point was obtained. Theoretically, as apparent from the phase diagram at FIG. 3, an alloy containing P not more than about 1.75% should not be used as a brazing material because only P—Cu solid solution is produced and, hence, any eutectic structure does not result in the alloy. Actually, however, segregation of P gives rise to a P>1.75% region partially in the alloy, which is presumed to make a contribution as a brazing material. It is to be noted that all the portions that were broken in the tensile test were brazed portions.

From the findings described above, the P content of a phosphorus-copper brazing alloy forming the phosphorus-copper brazing material of the present invention is preferably within the range of not less than about 2.0 mass % to not more than about 3.2 mass %, which ensures both a joint strength of the conventional level and workability to such an extent as to allow cold rolling to a rolling reduction of about 95% or more. The P content is preferably in the range of not less than about 2.2 mass % to not more than about 2.9 mass %. The balance consists essentially of Cu. The expression "the balance consists essentially of Cu", as used herein, is meant to include the case where the balance consists of Cu and unavoidable impurities and not to preclude addition of any other element that can be alloyed with the alloy of the present invention unless it impairs the action and effect of P contained in the alloy. While a temperature that is higher than the eutectic temperature of P—Cu (714° C.) is sufficient as a brazing temperature for the phosphorus-copper brazing material (alloy) according to a preferred embodiment of the present invention, the brazing temperature usually ranges from about 780° C. to about 850° C. It is preferred that brazing with the brazing material (alloy) of a preferred embodiment of the present invention be performed in vacuum or in a reducing gas atmosphere such as of hydrogen gas.

The aforementioned P—Cu brazing alloy according to a preferred embodiment of the present invention, which has excellent cold workability, can readily be worked into various shapes and hence can form brazing materials of appropriate shapes such as thin sheet and wire. In the case where the alloy is cold-rolled into a sheet, the thickness of the sheet is preferably adjusted to fall within the range from about 0.01 mm to about 0.15 mm in order to ensure satisfactory brazing operability and a required joint strength as well as to reduce the amount of brazing material to be lost without contributing to brazing.

Figure 4:
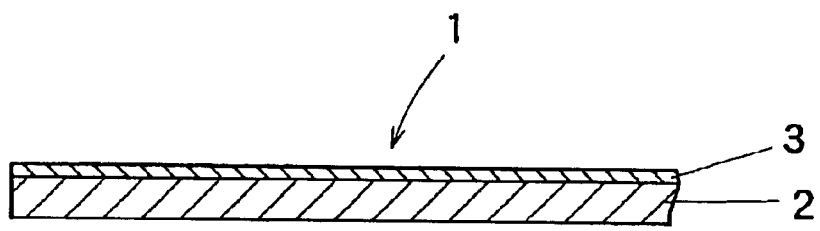
FIG. 4 is a fragmentary sectional view of a brazing sheet according to a preferred embodiment of the present invention.
Figure 5:
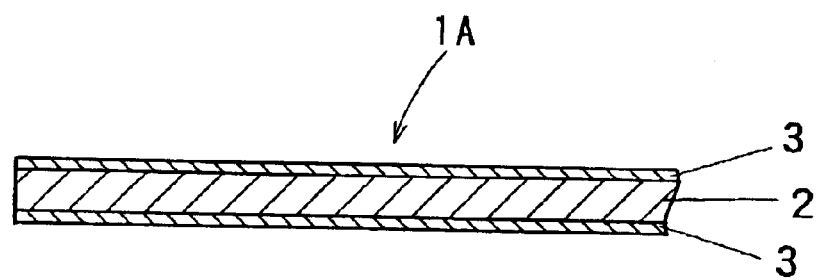
FIG. 5 is a fragmentary sectional view of a brazing sheet according to another preferred embodiment of the present invention.

Though the phosphorus-copper brazing material of preferred embodiments of the present invention may be used alone, it may be pressure-welded to an appropriate metal sheet taking advantage of its high cold workability, to form a brazing sheet 1, 1A having a brazing material layer 3 of the phosphorus-copper brazing alloy formed integral with a metal sheet 3 on one side or opposite sides of the metal sheet 3 as shown in FIG. 4 or 5. Even in this case the thickness of the brazing material layer 3 is preferably adjusted to fall within the range from about 0.01 mm to about 0.15 mm. Such a brazing sheet 1, 1A enables the metal sheet 2 thereof to be easily brazed to a metal member through a simple operation of placing the metal member to abut the brazing material layer 3 of the brazing sheet 1,1A before heating. Thus, the brazing sheet according to preferred embodiments of the present invention is excellent in brazing operability.

Such a metal sheet 2 is preferably formed of pure Cu or a Cu alloy including Cu as a major component (hereinafter both generally referred to as "Cu-based metal"). Use of metal sheet 2 formed of such a Cu-based metal brings about improvements in the pressure-weldability between the metal sheet 2 and the brazing material layer 3 and in the productivity of the brazing sheet thereby. Further, since the fusion-bonding property, or wettability between the two upon brazing is also improved, the brazing sheet is excellent in brazeability.

An alloy of which the constituents are in a completely solid solution state, such as Cu—Ni alloy or Cu—Mn—Ni alloy, is preferably used as the Cu-based metal. It is sufficient for the Cu-based metal to have a Cu content of about 85% or more. The Cu-based metal permits addition of a minute amount of other element thereto as long as the element is capable of forming a solid solution with Cu and does not impair the workability of the brazing material or the characteristics of a brazing material portion of a joint formed by brazing.

The brazing sheet 1,1A can simply and easily be manufactured through a process including the steps of superposing a brazing material sheet formed of the phosphorus-copper brazing alloy on one side or opposite sides of a metal substrate, and passing the resulting superposed structure through a pair of rolls to cold pressure-weld the sheet and the metal substrate together. The cold pressure-welding provides a laminate including brazing material layer 3 reduced from the brazing material sheet and metal sheet 2 reduced from the metal substrate, the brazing material layer 3 being formed integrally with the metal sheet 2 on one side or opposite sides of the metal sheet 2.

The phosphorus-copper brazing alloy according to preferred embodiments of the present invention can be used as a brazing material in various applications such as joining of conventional joint members, joining of piping, and brazing of an electric contact. As described earlier, the phosphorus-copper brazing alloy can be worked into various shapes by virtue of its excellent cold workability. Therefore, the phosphorus-copper brazing alloy can advantageously be used particularly in such an application where a brazing material is worked into a desired shape and then placed at a portion where parts or members are to be joined by brazing. For example, in brazing a small-diameter tubular member to a large-diameter tubular member with an end portion of the small-diameter tubular member being positioned as inserted into an end portion of the large-diameter tubular member, the phosphorus-copper brazing alloy can be worked into a ring-shaped brazing material, which in turn is placed between the end portions of these tubular members for brazing of the tubular members to each other. Alternatively, in an application where a first shaft member having a hollow, substantially cylindrical portion at an end thereof, the hollow, substantially cylindrical portion having an inner peripheral wall formed with a plurality of grooves extending substantially parallel with the axis of the shaft, is brazed to a second shaft member having an end portion formed on an outer periphery thereof with a plurality of ridges for engagement with the grooves, with the first and second shaft members being positioned so that the ridges formed on the outer periphery of the end portion of the second shaft member engage the grooves formed at the inner peripheral wall of the hollow, substantially cylindrical portion of the first shaft member, the phosphorus-copper brazing alloy can be worked into a ring-shaped brazing material circumferentially and irregularly bent so as to fit into the gap defined between the grooves of the first shaft member and the ridges of the second shaft member for brazing of the first and second shaft members to each other.

As described earlier, the phosphorus-copper brazing alloy according to preferred embodiments of the present invention is suitable for the brazing material layer 3 of the brazing sheet 1,1A by virtue of its excellent cold workability and cold pressure-weldability. The brazing sheet according to preferred embodiments of the present invention makes it possible to ease the brazing operation. Further, the brazing sheet can easily be formed into various joining members of different forms having respective brazing material layers, since brazing material layer 3 that is integral with the metal sheet 2 can easily worked into various shapes.

Next, description will be made of another preferred embodiment of a brazed structure using the brazing sheet according to the aforementioned preferred embodiment as a raw material.

Figure 6:
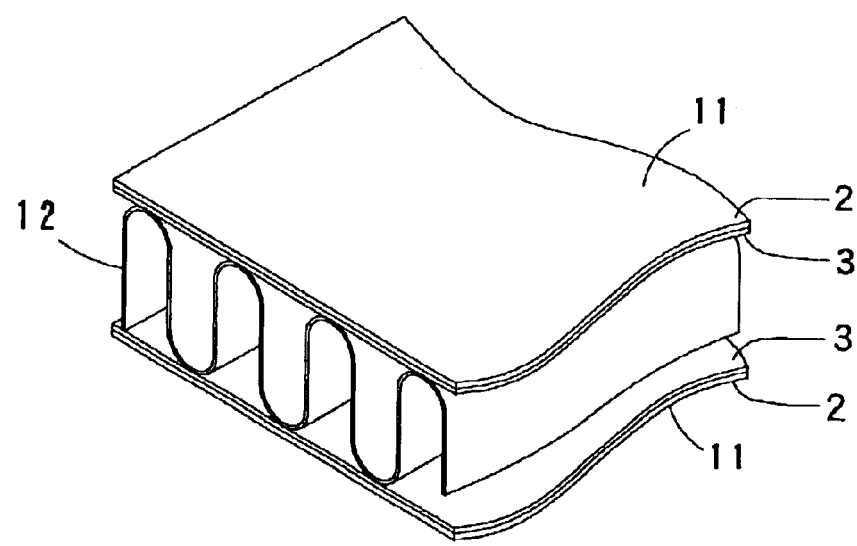
FIG. 6 is a partially cutaway view in perspective of a flow path structure for heat exchangers according to a preferred embodiment of the present invention.

FIG. 6 is a partially cutaway view in perspective of a flow path structure for heat exchangers according to this preferred embodiment of the present invention. As shown in FIG. 6, the flow path structure includes a pair of opposed sheet members 11 with a predetermined spacing therebetween, and a bellows-shaped partition member 12 bent to form waves in section, the partition member 12 being fitted between the pair of sheet members 11. Each of the sheet members 11 includes the aforementioned brazing sheet 1 worked into an appropriate shape. The partition member 12 includes, for example, a thin copper sheet corrugated into a bellows shape. In this preferred embodiment, the brazing sheet 1 forming each sheet member 11 is of the type having brazing material layer 3 on one side of metal sheet 2 as shown in FIG. 4.

The uppermost portions, or peaks of the wave of the partition member 12 are brazed to the lower side of the metal sheet 2 of the upper sheet member 11 by means of the brazing material layer 3 of the upper sheet member 11. Similarly, the lowermost portions, or valleys of the wave of the partition member 12 are brazed to the upper side of the metal sheet 2 of the lower sheet member 11 via the brazing material layer 3 of the lower sheet member 11. The metal sheets 2 forming a portion of the respective sheet members 11 are equivalent to the first and second wall members defined in preferred embodiments of the present invention.

In this preferred embodiment, a plurality of partitioned spaces defined by the partition member 12 between the pair of sheet members 11 serve as a flow path of fluid to be heated or cooled such as water. Though not shown, a heating or cooling device in which a heating or cooling medium flows is provided outside the sheet member 1 for heating or cooling the fluid flowing in the flow path.

The flow path structure for heat exchangers according to the present invention should not be construed as limited to the foregoing preferred embodiment. For example, the number of sheet members 11 and the number of tiers of flow path of fluid to be heated or cooled defined between a pair of opposed sheet members 11 (the number of sheet members 11 minus 1) may be established as desired. In brazing partition members 12 to the opposite sides of sheet member 11, the brazing sheet forming the sheet member 11 to be used is the brazing sheet 1A of the type having brazing material layers joined to metal sheet 2 on opposite sides of the metal sheet 2 as shown in FIG. 5. While fluid to be heated or cooled is allowed to flow in the flow path fitted with the partition member 12 in the foregoing preferred embodiment, a heating or cooling medium may be allowed to flow therein to heat or cool an object located outside sheet member 1. The flow path structure according to the present invention is applicable to various heat exchangers used in air conditioners installed in buildings, vehicles, industrial equipment, electronic instrument and other such apparatuses.

The phosphorus-copper brazing material according to preferred embodiments of the present invention is formed of a phosphorus-copper brazing alloy including copper as a major component and phosphorus of not less than about 2.0% to not more than about 3.2%. The brazing material of this constitution has very high cold workability and satisfactory brazeability. Thus, the phosphorus-copper brazing material can easily be worked into a thin-sheet brazing material which has excellent brazing operability and handling property. Further, the phosphorus-copper brazing material can easily be pressure-welded to a metal sheet to form a brazing sheet. Therefore, the phosphorus-copper brazing material can advantageously be used as a brazing material in the brazing of a brazed structure such as a flow path structure for heat exchangers.

While only presently preferred embodiments of the present invention have been described in detail, as will be apparent for those skilled in the art, certain changes and modifications can be made to various preferred embodiments without departing from the spirit and scope of the present invention as defined by the following claims.

What is claimed is:

1. A phosphorus-copper brazing material made of a phosphorus-copper brazing alloy consisting essentially of not less than about 2.2 mass % to not more than about 2.9 mass % of phosphorus and the balance being copper and unavoidable impurities.

2. The phosphorus-copper brazing material according to claim 1, wherein the phosphorous-copper brazing material has a thin sheet form having a thickness of about 0.01 mm to about 0.15 mm.

3. A method for manufacturing a phosphorus-copper brazing material, the method comprising the steps of providing a phosphorus-copper brazing alloy consisting essentially of not less than about 2.2 mass % to not more than about 2.9 mass % of phosphorus and the balance being copper and unavoidable impurities, arid cold-rolling a cast piece of the phosphorus-copper brazing alloy into a thin sheet.

4. A brazing sheet comprising a metal sheet, and a brazing material layer that is integral with the metal sheet on at least one side of the metal sheet, the brazing material layer being made of a phosphorus-copper brazing alloy consisting essentially of not less than about 2.2 mass % to not more than about 2.9 mass % of phosphorus and the balance being copper and unavoidable impurities.

5. The brazing sheet according to claim 4, wherein the metal sheet is formed of one of copper and a copper alloy including copper as a major component.

6. A method for manufacturing a brazing sheet, comprising the steps of:

superposing a brazing material sheet formed of a phosphorus-copper brazing alloy on at least one side of a metal substrate, the phosphorus-copper brazing alloy consisting essentially of not less than about 2.2 mass % to not more than about 2.9 mass % of phosphorus and the balance being copper and unavoidable impurities; and cold pressure-welding the brazing material sheet to the metal substrate to form a one-piece sheet in which a brazing material layer reduced from the brazing material sheet is integrally formed with a metal sheet reduced from the metal substrate.

7. A flow path structure for heat exchangers, comprising a pair of first arid second wall members disposed opposite to each other, and a partition member partitioning a flow path located between the first and second wall members into a plurality of trickle regions, the partition member being brazed to opposed surfaces of the first and second wall members with a phosphorus-copper brazing alloy including copper as a major component and phosphorus in a range of not less than about 2.0 mass % to not more than about 3.2 mass %.

8. The flow path structure according to claim 7, wherein the first and second wall members and the partition member are formed of one of copper and a copper alloy including copper as a major component.

* * * * *